United States Patent Office 3,381,796
Patented May 7, 1968

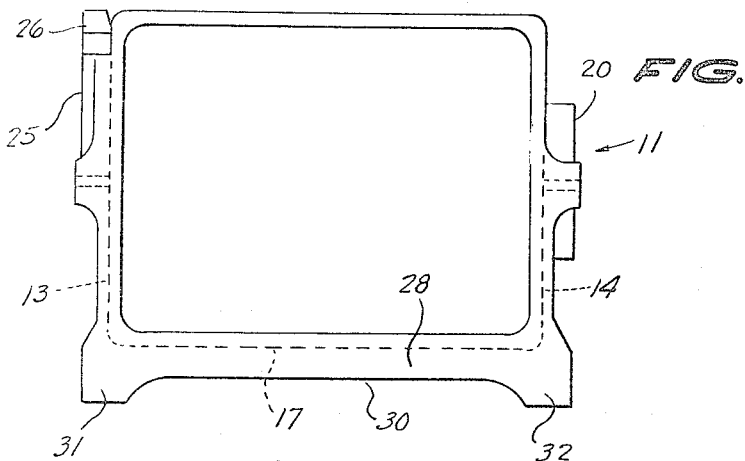
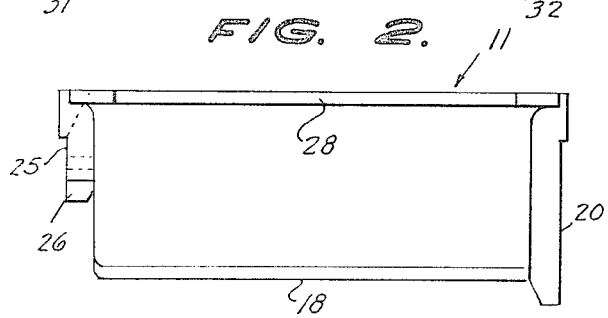
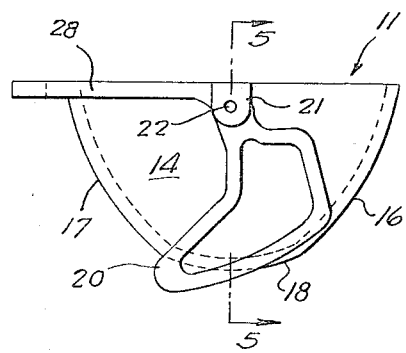
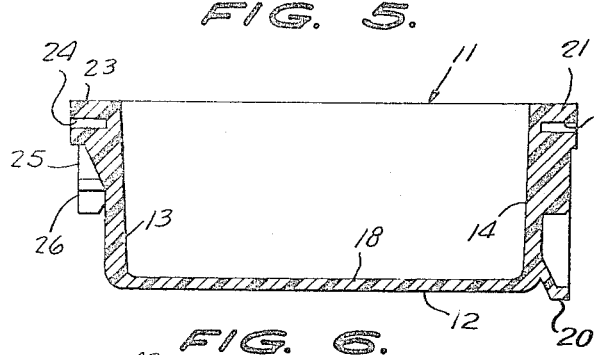
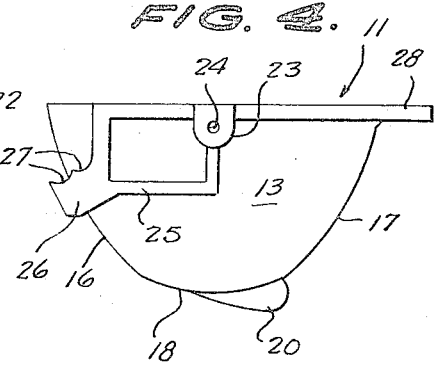
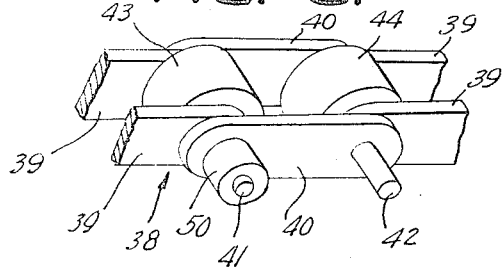

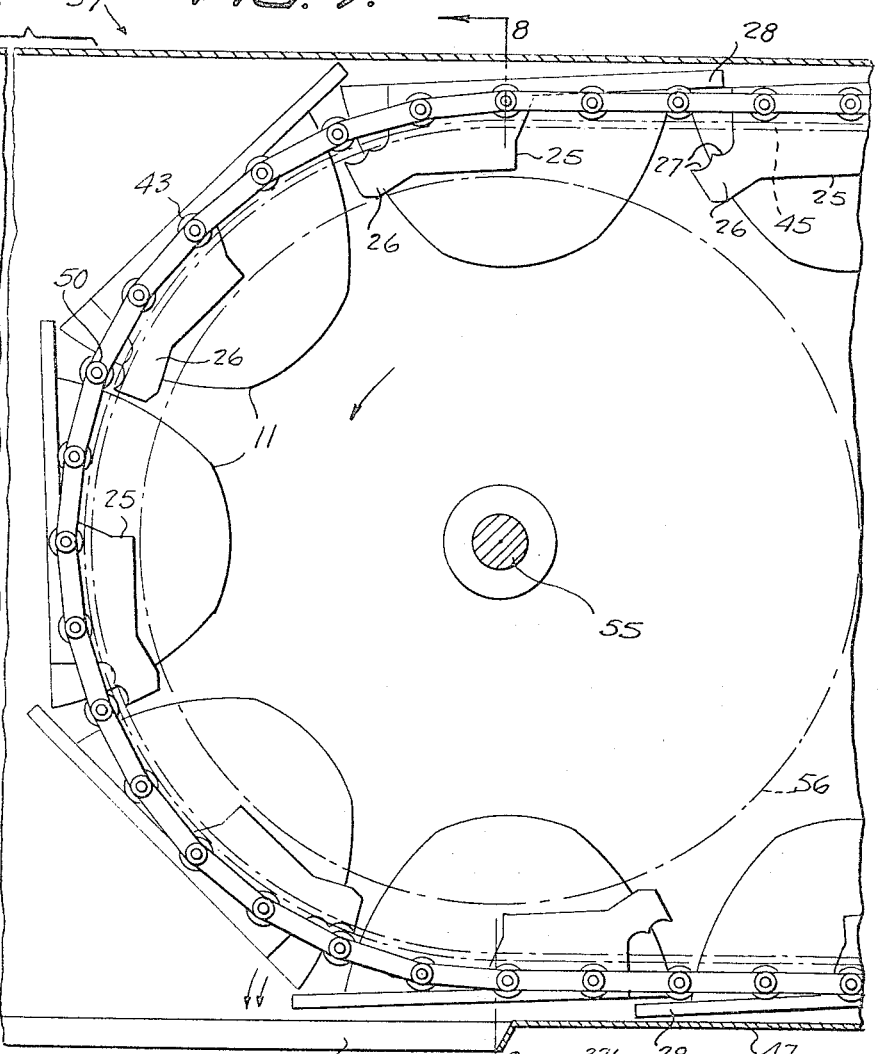
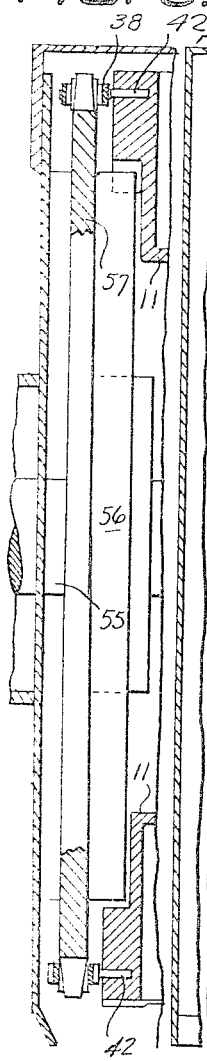
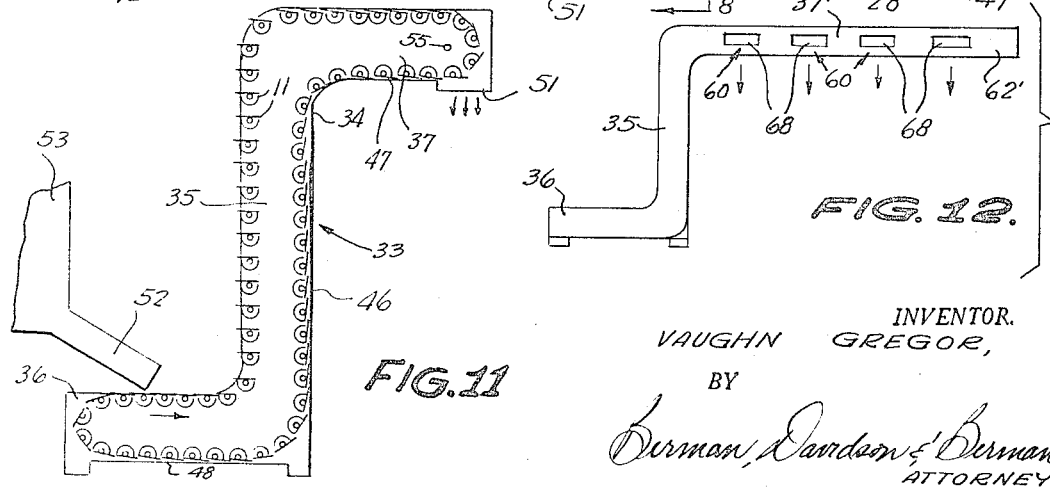
INVENTOR.
VAUGHN GREGOR,
BY
Berman, Davidson & Berman
ATTORNEYS.

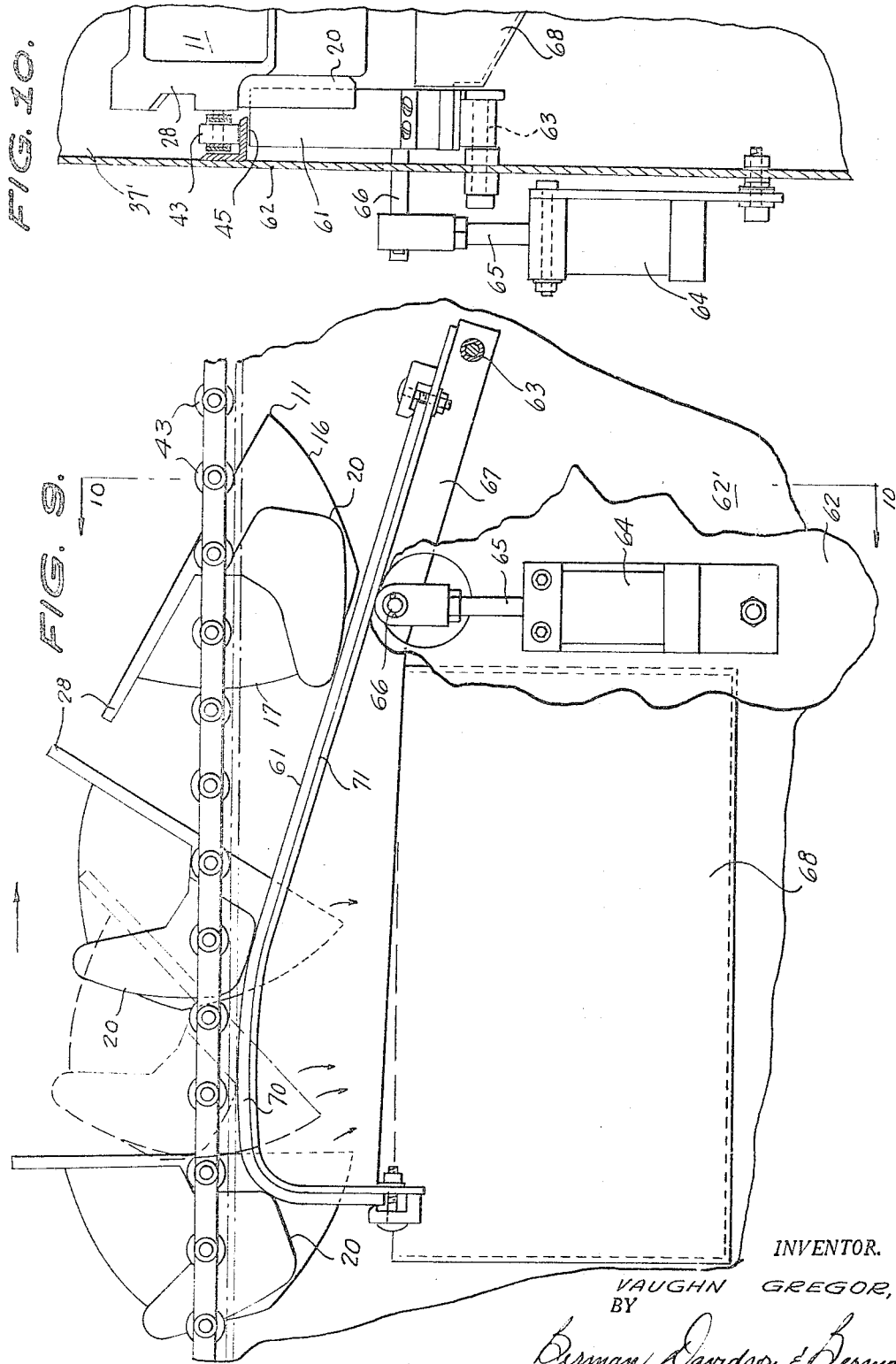

3,381,796
MOLDED PIVOT BUCKET FOR A CONVEYOR
Vaughn Gregor, 5524 Green Oak St.,
Hollywood, Calif. 90028
Filed Mar. 3, 1967, Ser. No. 620,529
9 Claims. (Cl. 198—146)

ABSTRACT OF THE DISCLOSURE

A bucket conveyor assembly consisting of a pair of parallel endless link chains with buckets pivoted between the chains, the buckets being shaped so that they are gravitationally biased toward horizontal upwardly-facing positions. Each bucket has a top flange projecting from a side edge adapted to overlap the top edge of the adjacent bucket and acting to seal the space between the side-by-side buckets. The chains are mounted on a guide frame having a horizontal bottom material-receiving portion, a horizontal top-discharge portion, and an intermediate vertical elevator portion. Each bucket has a projection cooperating with a pin on an adjacent chain to invert the buckets as they move around the top end of the frame, causing discharge of their contents. Each bucket has a counterweight projection which may be employed in conjunction with pivoted ramps on the frame to tilt the buckets so as to cause discharge thereof at selected positions on the top portion of the frame. The buckets are held in outwardly-facing positions by sliding engagement with transverse wall elements of the frame as the buckets return from the top portion to the bottom portion of the frame.

---

This invention relates to material-handling apparatus, and more particularly to material-conveying apparatus of the type employing pivoted buckets carried by endless belts.

A main object of the invention is to provide a novel and improved conveyor employing pivoted buckets for moving or distributing material, the conveyor being relatively simple in construction, being easy to install, and operating to efficiently move material from a feeding point to a desired point of discharge with minimum spillage, breakage or leakage of the material and with minimum contamination thereof.

A further object of the invention is to provide an improved bucket conveyor assembly which involves relatively inexpensive components, which is durable in construction, which operates automatically to deliver the material carried thereby to the desired point of discharge, and which is easy to maintain in clean and sanitary condition.

A still further object of the invention is to provide an improved bucket conveyor system employing buckets which are durable in construction, which do not employ metal inserts so that they are not readily subject to deformation, mis-alignment, or cracking, and which are easily cleaned so that they are especially suitable for use in conveying various types of food products, as well as other commodities.

A still further object of the invention is to provide an improved conveyor system employing one-piece molded buckets which are shaped so that they are gravitationally-biased to upright positions and which are provided with integral projections cooperable with elements of the adjacent conveyor system to control the orientation of the buckets, for example, to invert the buckets at desired positions of the associated system for the purpose of discharging the contents of the buckets, the buckets being further provided with flanges so that the adjacent side-by-side buckets seal each other, preventing material from falling therebetween as they are traveling, the flanges also acting on the adjacent buckets to prevent undesired rotation thereof.

Further objects and advantages of the invention will become apparent from the following description and claims, and from the accompanying drawings, wherein:

FIGURE 1 is a top plan view of a conveyor bucket employed in a system according to the present invention.

FIGURE 2 is a side elevational view of the conveyor bucket of FIGURE 1.

FIGURE 3 is an end elevational view of the conveyor bucket of FIGURE 2, taken from the right.

FIGURE 4 is an end elevational view of the bucket of FIGURE 2, taken from the left.

FIGURE 5 is a longitudinal vertical cross-sectional view taken through the conveyor bucket of FIGURES 1 to 3, substantially on the line 5—5 of FIGURE 3.

FIGURE 6 is an enlarged fragmentary perspective view of a portion of one of the conveyor chains associated with a bucket conveyor system according to the present invention employing buckets similar to that illustrated in FIGURES 1 to 5.

FIGURE 7 is a vertical cross-sectional view taken longitudinally through the top end portion of a bucket conveyor constructed in accordance with the present invention and illustrating the manner in which the orientations of the buckets are controlled as they pass around the top end of the conveyor, being inverted to discharge their contents.

FIGURE 8 is a fragmentary transverse cross-sectional view taken substantially on the line 8—8 of FIGURE 7.

FIGURE 9 is a fragmentary longitudinal vertical cross-sectional view taken through a portion of a bucket conveyor system according to the present invention provided with means to effect intermediate discharge of the contents of the buckets of the conveyor, for example, at a desired location along the top portion of the conveyor in a conveyor system similar to that diagrammatically illustrated in FIGURE 12.

FIGURE 10 is a fragmentary transverse vertical cross-sectional view taken substantially on the line 10—10 of FIGURE 9.

FIGURE 11 is a diagrammatic longitudinal vertical cross-sectional view taken through one form of bucket conveyor system constructed in accordance with the present invention, wherein the buckets discharge at the top end of the conveyor system.

FIGURE 12 is a diagrammatic side elevational view of another form of bucket conveyor system according to the present invention provided with means such as that illustrated in FIGURES 9 and 10 for effecting selective discharge of the contents of the buckets of the system at desired intermediate points along the top portion of the conveyor system, for example, in accordance with a preset program.

Referring to the drawings, FIGURES 1 to 5 illustrate a typical bucket employed in a conveyor system according to the present invention. Thus, the bucket is designated generally at 11 and comprises a generally semi-cylindrical main body 12 with vertical opposite end walls 13 and 14. The bucket 11 is preferably made of molded plastic material, for example, polypropylene, "Lexan," or similar plastic material, and contains no steel or other metal elements. While the main body 12, as mentioned above, may be described as generally semicylindrical, it may have any other desirable cross-shaped cross-section, for example, may comprise the generally arcuate, downwardly-convergent main longitudinal wall elements 16 and 17 merging with the upwardly-concave bottom wall element 18 illustrated in FIGURE 4.

End wall 14 is integrally-formed with the downwardly- and laterally-inclined projection 20 in the form of a hollow rib having a generally L-shaped over-all configuration, as shown in FIGURE 3, and merging at one of its top corners with the integral trunnion boss 21 located substantially centrally of the top marginal portion of end wall 14. Trunnion lug 21 is formed with a horizontal pivot bore 22 extending longitudinally, as shown in FIGURE 5. The opposite end wall 13 is likewise provided with an integral trunnion boss 23 formed with a longitudinal pivot bore 24 aligned with pivot bore 22. End wall 13 is likewise formed with a generally rectangular hollow projection 25, namely, a rectangular rib configuration, as shown in FIGURE 4, terminating at its lower outer corner in a downwardly and outwardly-inclined lug 26 having the adjacent upwardly-facing arcuate notches 27, 27 formed in its top edge.

A horizontal peripheral flange 28 is integrally-formed at the top edge of the trough-like bucket body 12, extending along the top edge of the longitudinal arcuate wall element 17 and from the ends thereof along the top margins of end walls 13 and 14 to the trunnion lugs 23 and 21, as is clearly shown in FIGURES 3 and 4. Thus, the horizontal flange 28 projects laterally from the top of the longitudinal wall element 17, as well as from the adjacent portions of the end walls 13 and 14, as is clearly shown in FIGURE 1, the flange 28 being formed with a longitudinal, relatively shallow notch 30 defining the respective end tabs 31 and 32 adjacent the end walls 13 and 14.

The molded bucket is thus biased by its weight so that it tends to swing to an upwardly-facing, substantially horizontal position when pivotally-supported at its trunnion bores 22 and 24, the lug 20 acting as a counterbalance weight cooperating with flange 28 and the projections 25, 26 to balance the bucket so that it tends to assume the upwardly-facing horizontal position thereof shown in FIGURES 3 and 4.

Conveyor buckets such as that illustrated in FIGURES 1 to 5 are employed in a typical conveyor system similar to that illustrated in FIGURE 11 or in FIGURE 12. Thus, FIGURE 11 shows a conveyor system, designated generally at 33, having a generally Z-shaped configuration and comprising a correspondingly-shaped frame or housing 34 having a vertical main elevator portion 35, a horizontal bottom delivery portion 36 and a horizontal top discharge portion 37. The buckets 11 are pivotally-mounted on parallel endless chains 38 suitably-supported in the housing 33 and guided to follow the general configuration thereof, as illustrated in FIGURE 11. Thus, the chains 38 may comprise successive pivotally-connected link bars 39, 40 arranged in parallel pairs in the manner illustrated in FIGURE 6, and pivotally-connected by transverse pins 41 and 42 with supporting rollers 43, 44 journaled on the pins 41 and 42 between the respective opposing sets of parallel link bars 39, 39, as shown. The rollers 43, 44 engage guide rails 45 provided in the housing assembly 33 at the sidewalls thereof so as to support the chains and maintain the generally Z-shaped configuration thereof diagrammatically illustrated in FIGURE 11. The housing 33 includes a forward transverse wall element 46 at the elevator portion 35 thereof, merging with respective bottom transverse wall elements 47 and 48 at the top portion 37 and bottom portion 36 of the housing, slidably-engaged by the buckets in a manner presently to be described, to maintain them in positions such as those illustrated in FIGURE 11.

The projecting pin elements 42 of the chains 38 are rotatably-received in the trunnion bores 22 and 24 of the buckets 11 so that the buckets are pivotally-supported between the chains. Rollers 50 are journaled on the inwardly-projecting ends of the pivot pins 41, said rollers being engageable with the notches 27 of the bucket lugs 26 to cause the buckets to be inverted as the pass around the forward end of the conveyor top portion 37 to cause the buckets to empty their contents for discharge through the depending discharge spout portion 51, as will be presently described.

In the system illustrated in FIGURE 11, the material to be transported is delivered to the buckets at the top face of the receiving portion 36 of the conveyor housing, said top face being open and the buckets being in their normal upwardly-facing horizontal positions, with the flanges 28 thereof overlying the top edges of the adjacent buckets in the manner illustrated in FIGURE 11, whereby the spaces between the side-by-side adjacent buckets are substantially sealed. The material is delivered to the upwardly-facing buckets from an inclined discharge spout 52 extending from the supply hopper 53, as shown in FIGURE 11. The direction of belt movement is generally clockwise, as viewed in FIGURE 11, so that the loaded buckets move rightward in the conveyor portion 36 and then are elevated as they are moved upwardly through the vertical portion 35 of the housing. The buckets tend to assume their horizontal upwardly-facing positions as they move upwardly through portion 35, as diagrammatically shown in FIGURE 11, and then resume their overlapping positions in the top end of the upper conveyor housing portion 37. Mounted on one end portion of the transverse shaft 55 of the conveyor assembly at the right end of the top housing portion 37 is a guide pulley or wheel 56, the wheel 56 being rigidly-fixed to the drive sprocket 57 secured on shaft 55, as shown in FIGURE 8. The teeth of the sprockets 57 are engageable between the chain-supporting rollers 43, 44 in this region of the conveyor assembly. A bucket-control wheel 56 is provided only at the side of the conveyor assembly containing the rectangular projections 25 of the buckets. As shown in FIGURE 7, the projections 25 are receivable adjacent the periphery of the wheel 56 and cooperate with the wheel to control the position of each bucket as it passes around the wheel, limiting clockwise rotation of the buckets as they pass around the wheel. The rollers 50 engage in a notch 27 of each lug 26 as the buckets rotate around the axis of shaft 55, causing the buckets to become inverted as they move counter-clockwise, as viewed in FIGURE 7, from the top portion of housing section 37 to the lower portion thereof, whereby the contents of the buckets discharge into the spout portion 51. The flange elements 28 of the inverted buckets slidably-engage on the bottom wall 47 of housing section 37, holding the buckets inverted, successively slidably-engaging the vertical transverse wall element 46 of the main vertical portion 35 of the conveyor housing, and then engaging the bottom wall 48 of the lower segment 36. The buckets are thus maintained in the positions thereof diagrammatically illustrated in FIGURE 11 until they pass around the lower end of the conveyor system and assume their upwardly-facing horizontal positions located to receive the material from the delivery spout 52.

The spacing between the pins 41 and 42 determines the location of the notches 27 relative to the bucket trunnion axis. As shown, two or more notches 27 may be provided to take care of variations in the design of the conveyor chains, namely, variations in the length of the links employed in the conveyor chains.

FIGURE 12 illustrates an alternative arrangement of a conveyor system, generally similar to that of FIGURE 11, but provided with means for discharging the conveyor buckets at any one of several different selected positions 60 at the top portion of the conveyor housing, as shown at 37′. As shown in FIGURES 9 and 10, the top portion 37′ is provided adjacent the discharge positions 60 with pivoted ramps 61, pivoted transversely to the sidewall 62 of top section 37′ at 63 at the side of section 37′ containing the generally L-shaped projections 20 of the conveyor buckets. Each ramp 61 extends parallel to the adjacent sidewall 62 and the position thereof is controlled by an associated hydraulic cylinder 64 pivotally-mounted on the sidewall 62, as shown in FIGURES 9 and 10, having the upwardly movable piston rod 65 pivotally-connected at 66 to a depending flange 67 carried by the associated ramp member 61. Inclined discharge chutes 68 are provided beneath the respective discharge locations 60, the chutes 68 being inclined downwardly and laterally and extending through the opposite sidewall 62', but opening beneath the conveyor buckets to receive material discharged therefrom. Thus, the open top ends of the chutes 68 are located beneath the conveyor buckets moving on the top run of the conveyor in the top section 37' of the conveyor housing. The chutes 68 are inclined downwardly and laterally and open through the sidewall 62', as above-described, to discharge material laterally and outwardly of sidewall 62'. With piston 65 depressed, the associated ramp 61 is in a lowered position and the conveyor buckets pass thereover without contact therewith. When a cylinder 64 receives hydraulic fluid, causing its rod 65 to become elevated, the associated ramp member 61 likewise becomes elevated, for example, to the operative position thereof shown in FIGURE 9, whereupon the projections 20 of the buckets passing thereover engage the ramp 61, causing the buckets to be rotated clockwise, as illustrated in FIGURE 9, to tilted positions to discharge the contents of the buckets into the subjacent delivery chute 68 as the buckets pass thereover. As shown in FIGURE 9, the buckets move toward the right and the projections 20 cammingly-cooperate with the elevated ramp 61 to tilt the buckets to empty same as they pass over the discharge chute 68 and to gradually allow the buckets to resume their upwardly-facing horizontal positions as they disengage from ramp 61. The ramp 61 has a cam-shaped contour which is provided with the relatively horizontal top forward portion 70 initially-engageable by the projections 20 and which merges thereafter with the gently-inclined downwardly-extending forward portion 71 leading toward the pivotal axis 63, as shown in FIGURE 9. Thus, the buckets are relatively rapidly rotated as they engage the uppermost ramp portion 70, causing them to discharge their contents into chute 68, and thereafter allowing the buckets to gradually rotate counterclockwise, as viewed in FIGURE 9, by gravity to their horizontal upwardly-facing positions.

Suitable control means, not shown, may be provided for selecting a desired discharge location 60, namely, for selectively-energizing the valves associated with the hydraulic fluid supply to the cylinders 64, whereby to selectively-operate said hydraulic cylinders 64 in accordance with the desired delivery locations 60. The sequence of operation of the ramp-elevating cylinders 64 may be governed in accordance with any suitable well-known programming means.

As above-mentioned, the conveyor buckets 11 are of one-piece, molded construction and the side-by-side buckets overlap at the point of charging thereof, namely, in the region below the spout 52 which furnishes the material to the buckets. Thus, the flanges 28 of the buckets overlie the longitudinal edges of the adjacent buckets, providing a seal between the buckets. This prevents spillage between buckets and breakage or leakage of the material or objects delivered to the buckets. As above-described, the buckets are provided with the integral projections cooperating with the conveyor structure to automatically turn the buckets over at the point of discharge, thereby quickly and thoroughly emptying their contents. The buckets are completely turned over at the point of discharge and they face downwardly or face outwardly, as above-described, as they return to the filling point. This permits easy cleaning of the buckets while they are in motion.

While certain specific embodiments of an improved conveyor and conveyor bucket construction have been disclosed in the foregoing description, it will be understood that various modifications within the spirit of the invention may occur to those skilled in the art. Therefore, it is intended that no limitations be placed on the invention except as defined by the scope of the appended claims.

I claim:

1. In a conveyor, a supporting frame having a substantially horizontal bottom filling portion, a substantially horizontal top discharge portion and an upstanding intermediate portion connecting said filling and discharge portions, a pair of endless conveyor chains mounted in parallel relationship on said frame, guide means on the frame engageable by the chains and substantially conforming in configuration with the frame to maintain the configuration of the chains similar to and conforming with the contour of the frame, said chains comprising links connected by regularly-spaced inwardly-directed pivot pins, respective transverse conveyor buckets pivoted on said pivot pins, each bucket being a one-piece plastic pivoted bucket containing no steel or other metal elements and having the major portion thereof suspended below the pivot pins whereby the buckets normally face upwardly, a side flange at one top edge of each bucket engageable over the top edge of the sidewall of the adjacent bucket, said horizontal top portion of the frame having at least one point of downward discharge, a projection on an end wall of each bucket, means adjacent said point of downward discharge engageable with the projections to rotate the buckets to discharge positions as they pass said point of discharge, wherein sprockets are provided at the ends of the frame, said chains engaging on and extending around said sprockets, and a disc member secured coaxially with and inwardly of a sprocket on the top end of the frame and located to engage and cooperate with said projections to limit rotation of the buckets as they pass around said top end, wherein the means to rotate the buckets to discharge positions comprises inwardly-directed regularly-spaced bucket-operating elements on a chain engageable with the projections to invert the buckets as they pass around said top end.

2. The conveyor of claim 1, and wherein said bucket-operating elements comprise rollers journaled on said last-named chain.

3. The conveyor of claim 2, and wherein said projections are formed with arcuate notches engageable with said rollers.

4. The conveyor of claim 3, and an integral counterweight projection on the opposite end wall of each bucket.

5. The conveyor of claim 4, and transverse wall means on the undersides of the top and bottom portions of the frame, and on the transverse side of said upstanding intermediate portion adjacent said top frame portion slidably-engageable by the bucket flanges to maintain the buckets inverted at the undersides of said top and bottom portions and to maintain the buckets in outwardly-facing overlapping positions at said transverse side of the upstanding intermediate frame portion.

6. The conveyor of claim 5, and wherein said counterweight projections are inclined downwardly and in a direction opposite to the direction of said first-named projections.

7. The conveyor of claim 6, and wherein said counterweight projections comprise generally L-shaped hollow lugs.

8. The conveyor of claim 7, and a plurality of longitudinally-spaced ramp elements pivoted to the upper portion of the frame in the vertical plane of said counterweight projections and adjacent the path of movement of said counterweight projections, and means to selectively-rotate said ramp elements into sufficient camming engagement with said counterweight projections to tilt the buckets to discharge positions as they pass the ramp elements, and to gradually return the buckets to the normal upwardly-facing position.

9. A conveyor bucket comprising a body of molded plastic material having generally arcuate downwardly-convergent opposite longitudinal wall elements, an upwardly-concave bottom wall element merging with said longitudinal wall elements, and substantially vertical end wall elements merging with the opposite ends of said longitudinal and bottom wall elements to define an upwardly-facing receptacle, said end wall elements being formed at the intermediate portions of their top margins with longitudinally-aligned trunnion bores, a horizontal flange formed integrally with said body and extending outwardly from the top edge of one of said longitudinal wall elements, a downwardly and outwardly-inclined projection integrally-formed on one of said end wall elements, and a generally L-shaped downwardly and laterally-inclined counterweight projection integrally-formed on the opposite end wall element inclined oppositely to said first-named projection.

References Cited

UNITED STATES PATENTS

| | | | |
|---|---|---|---|
| 1,048,834 | 12/1912 | Hunt | 198—146 |
| 1,343,184 | 6/1920 | Baker et al. | 198—145 |
| 3,055,486 | 9/1962 | Meyer | 198—145 |
| 3,083,814 | 4/1963 | Meyer | 198—145 |
| 3,144,123 | 8/1964 | Wiese | 198—149 |

EVON C. BLUNK, *Primary Examiner.*

M. L. AJEMAN, *Assistant Examiner.*